Aug. 8, 1961   J. SALMON   2,995,193
ROOT CROP HARVESTING MACHINES
Filed Aug. 12, 1959   3 Sheets-Sheet 3

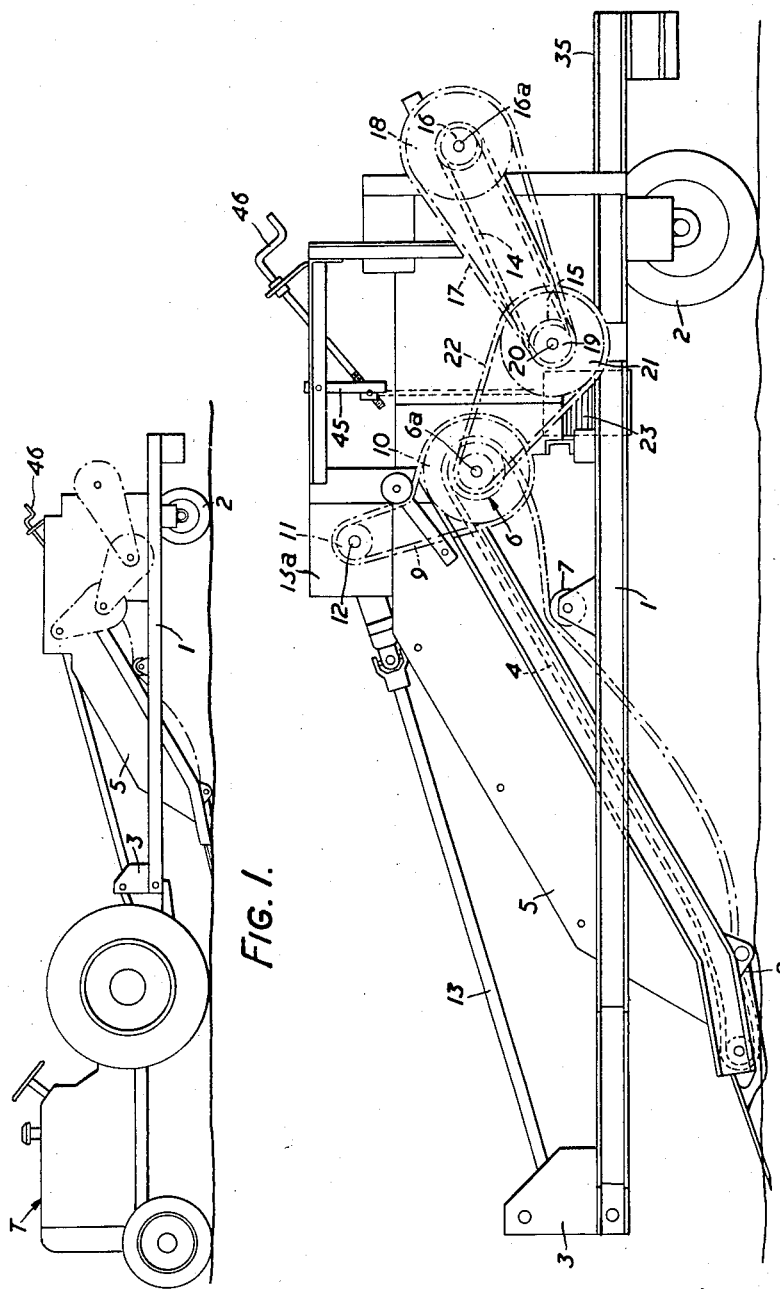

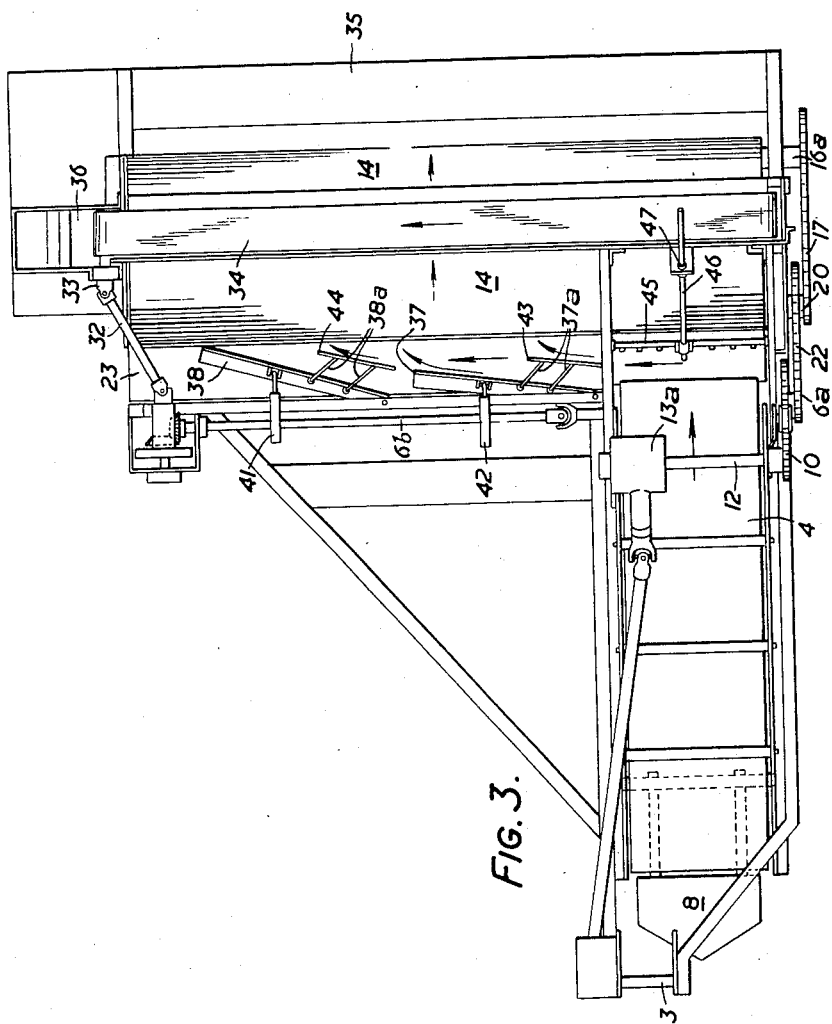

INVENTOR
J. SALMON
BY
Holcombe, Wetherill & Brisebois
ATTORNEYS 2,995,193
Patented Aug. 8, 1961

2,995,193
ROOT CROP HARVESTING MACHINES
John Salmon, Dunmow, England
Filed Aug. 12, 1959, Ser. No. 833,308
Claims priority, application Great Britain Aug. 15, 1958
3 Claims. (Cl. 171—20)

This invention relates to root crop harvesting machines of the kind adapted to be driven or towed over the ground and provided with means for digging up root crops and transferring them to a conveyor belt or the like.

In the operation of known machines of this kind a very considerable amount of dirt is lifted with the roots and it has been considered necessary to pass the crops over a riddling conveyor to clean the crops before they are discharged from the end of the riddle to the ground for subsequent collection.

In order to clean the root crops effectively a relatively long riddling conveyor or a multiplicity of riddling conveyors has been necessary and this not only increases the cost of the machine but also its overall length. Further the root crops as they are discharged onto the ground at the end of the machine, have to be picked up by hand and placed into containers and carried to a store place. This collection involves heavy and wasteful expenditure of labour.

According to the present invention a root crop harvesting machine comprises a frame mounted for movement over the ground, means for digging up root crops from the ground, a lifting conveyor for conveying the root crops upwardly, a picking conveyor of considerably greater width than the lifting conveyor, a distribution conveyor disposed between the discharge end of the lifting conveyor and the infeed end of the picking conveyor and extending substantially the full width of the latter, and means for pushing root crops from the picking conveyor so as to distribute them substantially evenly over its surface.

The root crops are picked by hand from the picking conveyor and may be loaded on to a further conveyor for discharge into sacks or other receptacles.

The machine is particularly adapted for harvesting potatoes.

To enable the invention to be fully understood it will now be described with reference to the accompanying drawings in which:

FIG. 1 is a side view of a root crop harvesting machine according to one embodiment of the invention, connected to a towing tractor;

FIG. 2 is a side view of the root crop harvesting machine;

FIG. 3 is a plan view thereof;

Figure 4:
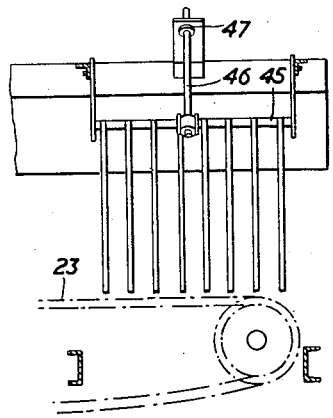
FIGURE 4 is a detail showing in side elevation the adjustable gate.

As shown in the accompanying drawings a root crop harvester comprises a frame 1 supported on wheels 2 and having means 3 for connecting it to a towing tractor T.

At one side of the frame is mounted an endless conveyor 4 preferably of the slatted type and running between side plates 5. The conveyor extends upwardly and longitudinally of the frame 1 from adjacent the ground to a drive sprocket 6 round which the conveyor is wrapped. The under run of the conveyor is slack and supported by one or more transverse rollers 7. Adjacent the lower end a digging implement 8 is provided for digging the root crops from the ground as the harvester is pulled along by the tractor, the lifted roots being deposited on the conveyor 4 to be carried upwardly.

The conveyor 4 is driven by an endless chain 9 which is wrapped round a chain wheel 10 on the shaft 6a of the sprocket 6 and a chain wheel 11 on a transverse drive shaft 12 which is rotated by a power shaft 13 driven by the tractor T and connected to a gear box 13a.

A transversely extending picking conveyor 14 is provided supported on sprockets 15 and 16. The sprocket 16 is driven by an endless chain 17 which is wrapped round chain wheels 18 and 19 the wheel 18 being fast on the shaft 16a of the sprocket 16 and the wheel 19 on a shaft 20 which has a chain wheel 21 fast thereon and is adapted to be driven from the shaft 6a by an endless chain 22. The picking conveyor 14 extends the full or substantially the full width of the machine at a small upward angle and the driving arrangement is such that it is operated at fairly low speed for example 1/16 of the speed of the conveyor 4.

A transversely extending distributor conveyor 23 is located between the upper or discharge end of the conveyor 4 and the lower or infeed end of the picking conveyor 14.

The shaft 6a is connected by a universal joint with a transverse shaft 6b which drives a shaft 24 through bevel gearing in a gear box 25. Two chain wheels 26 (one only being visible in FIG. 5) are fast on the shaft 24 one driving an endless chain 27 to rotate the drive sprocket 28 of the conveyor 23. The other chain wheel 26 drives an endless chain 29 which drives a chain wheel 30 on a shaft 31 which is connected by a universally jointed shaft 32 with a shaft 33 of a drive sprocket of a loading conveyor 34 which extends transversely of the machine above the picking conveyor 14.

The function of the conveyors is as follows: the newly dug root crops are deposited in to the conveyor 4 which carries them upwardly. At the upper end of the conveyor 4, the crops spill over on to the distribution conveyor 23 and are carried thereby transversely of the infeed end of the picking conveyor 14, the crops being discharged at intervals on to the conveyor 14 by means to be described later. The root crops are conveyed forwardly at slow speed by the conveyor 14 and are picked off by hand by operators standing on the platform 35 at the forward or discharge end of the conveyor 14 and placed on the loading conveyor 34 which discharges them into a chute 36 adapted to have an open sack attached to its lower end.

The means for pushing the crops from the conveyor 23 on to the picking conveyor 14 comprises a series of reciprocating pusher arms.

Figure 5:
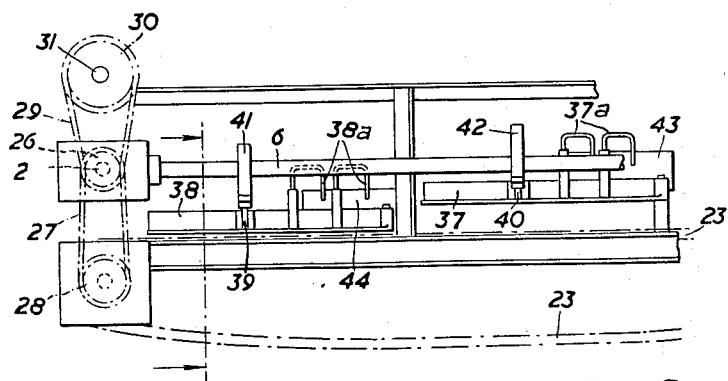
FIG. 5 is a fragmentary view showing in side elevation the pusher arms.
Figure 6:
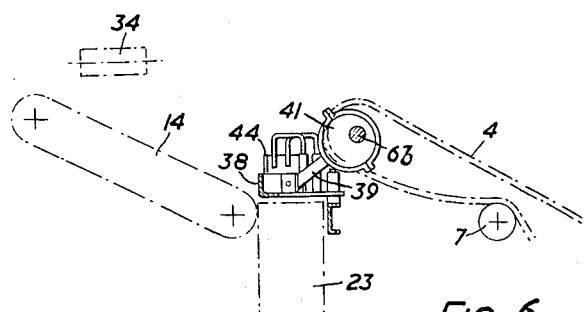
FIG. 6 is a view in line 6—6 of FIG. 5 and also indicating diagrammatically the positions of the various conveyors.

As shown more particularly in FIGS. 3, 5 and 6 two main pusher arms 37, 38 are provided spaced longitudinally of the conveyer 23, the arms being connected by links 39, 40 to eccentric drive discs 41, 42 on the shaft 6b.

Each arm 37, 38 is connected by bridge pieces 37a, 38a with further pusher arms 43, 44. It will be noted that the pusher arms extend parallel to the upper run of the conveyor 23 but are located at different heights above it, the pusher arm 43 being spaced the greatest distance above the conveyor, the arms 37, and 44 at progressively less distances above the conveyor and the arm 38 is only slightly spaced above the conveyor.

In operation the root crops spilling over from the upper end of the conveyor 4 will pile up on the infeed end of the conveyor 23 against an adjustable gate 45 mounted in spaced relation to the end of the conveyor 4. In practice some of the root crop will pass through the bars of the gate on to the infeed end of the picking conveyor 14. The remainder which will be 3 to 4 stratas high will be carried by the conveyor 23 along the conveyor 14.

It will be understood that the eccentric discs 41, 42 will be rotated in timed sequence such that the pusher arms 43, 37 will be reciprocated to push the top two stratas on to the picker conveyor 14 at transversely spaced locations and the pusher arms 44, reciprocated to push off the next strata, any crops remaining being pushed off by the last pusher arm 38.

The operation and location of the pusher arms is such that the crops being carried by the conveyor 23 will be substantially evenly distributed on to the slowly moving picking conveyor 14 so that they will be spread over its surface to be readily picked off by the operators and placed on the loader conveyor 34 which delivers them into sacks or other suitable containers.

The quantity of crops carried by the conveyor 23 may be varied by adjusting the position of the gate 45 and as shown this adjustment is effected by rotating a rod 46 which is mounted on a screw threaded bearing 47 so as to move the gate towards or away from the end of the conveyor 4.

The conveyors 4 and 14 preferably are of the slatted type, the spacing between the slats enabling them to riddle off dirt adhering to the root crops.

It will be understood that two or any desired number of pusher arms may be provided and they may be operated by any suitable means. All the pusher arms may be simultaneously reciprocated in unison so that all of them are oscillated into a position to push off the roots at the same time. Alternatively the pusher arms may be rotated in timed sequence so that when one or other of the arms is oscillated to push off roots one or other is making a backward or return movement.

The conveyor 23 is adapted to run at a speed approximately that of the speed at which the conveyor 4 operates. In one arrangement the conveyors 4 and 23 operate at a speed of approximately 200 feet per minute, while the wide conveyor 14 operates at a very much slower speed for example $1/16$ of that of the said other conveyors.

I claim:

1. A root crop harvesting machine comprising a frame, ground engaging wheels for supporting said frame, a digger tool at the forward end of said frame, a lifting conveyor extending rearwardly and upwardly of said frame from said digger tool, a horizontal distributor conveyor extending transversely of said frame adjacent the upper end of said lifting conveyor, an adjustable gate at the upper end of said lifting conveyor for controlling the flow of root crops on to said distributor conveyor, a picker conveyor extending rearwardly from said distributor conveyor and having a width considerably greater than that of the lifting conveyor and substantially equal to the width of said frame, means operative to drive said picker conveyor at a linear speed considerably less than that of said lifting conveyor and a series of power operated spreader devices spaced along said distributor conveyor and operative to push root crops from said distributor conveyor on to said picker conveyor.

2. A root crop harvesting machine comprising a frame, ground engaging wheels for supporting said frame, a digger tool at the forward end of said frame, a lifting conveyor extending rearwardly and upwardly of said frame from said digger tool, a substantially horizontal distributor conveyor extending transversely of said frame adjacent the upper end of said lifting conveyor for receiving root crops discharged from said lifting conveyor, a picker conveyor extending rearwardly from said distributor conveyor and having a width considerably greater than that of the said lifting and distributing conveyors, means for driving said picker conveyor at a linear speed considerably less than that of said lifting and distributor conveyors and a series of reciprocatably mounted spreader means spaced along said distributor conveyor and means for effecting the reciprocation of said spreader means to sweep root crops from said distributor conveyor on to said picker conveyor.

3. A root crop harvesting machine comprising a frame, ground engaging wheels for supporting said frame, a digger tool at the forward end of said frame, a lifting conveyor extending rearwardly and upwardly of said frame from said digger tool, a substantially horizontal distributor conveyor extending transversely of said frame adjacent the upper end of said lifting conveyor for receiving root crops discharged from said lifting conveyor, a picker conveyor extending rearwardly from said distributor conveyor and having a width considerably greater than that of the said lifting and distributing conveyors, means for driving said picker conveyor at a linear speed considerably less than that of said lifting and distributor conveyors and a series of reciprocably mounted pusher arms located at spaced distances along said distributor conveyor for pushing root crops from said distributing conveyor on to said picker conveyor, said pusher arms being disposed at different heights above the plane of said distributor conveyor such that the pusher arm at the end of the distributing conveyor adjacent the lifting conveyor is at a greater height than the other pusher arms, and the said other pusher arms are at progressively decreasing heights.

References Cited in the file of this patent

UNITED STATES PATENTS

| | | |
|---|---|---|
| 2,453,714 | Lapointe | Nov. 16, 1948 |
| 2,562,338 | Snyder | July 31, 1951 |
| 2,777,266 | Middleton et al. | Jan. 15, 1957 |